United States Patent [19]
Anderson

[11] 3,763,970
[45] Oct. 9, 1973

[54] ADJUSTABLE SHOCK ABSORBER

[76] Inventor: Richard D. Anderson, 866 S. Charles St., Elgin, Ill. 60120

[22] Filed: June 29, 1970

[21] Appl. No.: 50,591

[52] U.S. Cl............ 188/282, 188/315, 188/322
[51] Int. Cl............................................. F16f 9/44
[58] Field of Search.............. 188/280, 282, 314, 188/315, 319, 320, 322

[56] References Cited
UNITED STATES PATENTS

| | | | |
|---|---|---|---|
| 2,487,472 | 11/1949 | Patriquin | 188/319 |
| 3,548,977 | 12/1970 | Morgan | 188/299 |
| 2,182,016 | 12/1939 | Deutsch | 188/319 |
| 2,678,114 | 5/1954 | DeKoning et al. | 188/319 |

*Primary Examiner*—George E. A. Halvosa
*Attorney*—Molinare, Allegretti, Newitt & Witcoff

[57] ABSTRACT

A response adjustable shock absorber includes a valve movable relative to the piston of the shock absorber, the valve and piston having passages therein which are selectively alignable with each other so as to control the rate of transfer of fluid from one side of the piston to the other both during the compression and extension strokes of the piston. Also a bleed orifice is provided between the working cylinder of the shock absorber and a reservoir which may be selectively opened or closed to further control the response of the shock absorber at various speeds.

14 Claims, 10 Drawing Figures

PATENTED OCT 9 1973

3,763,970

INVENTOR.
RICHARD D. ANDERSON
BY Molinare, Allegretti
Newitt & Witcoff
ATTORNEYS

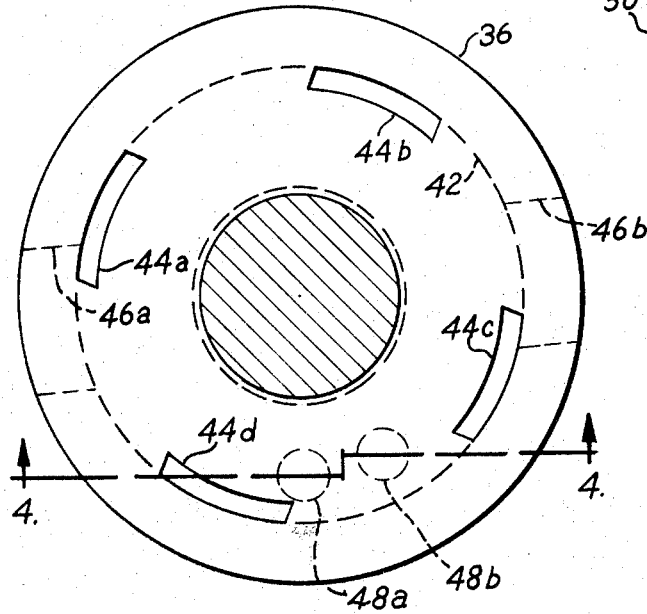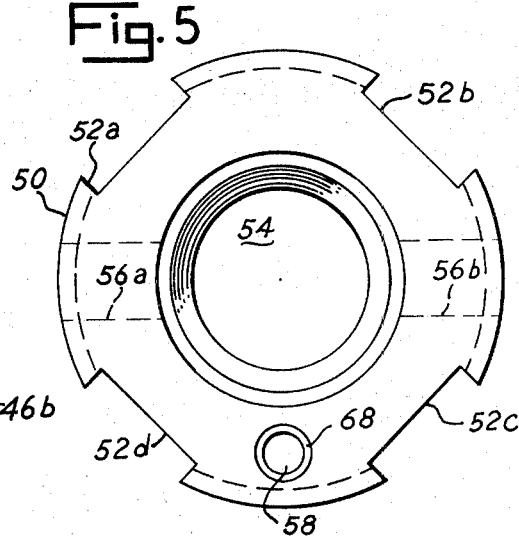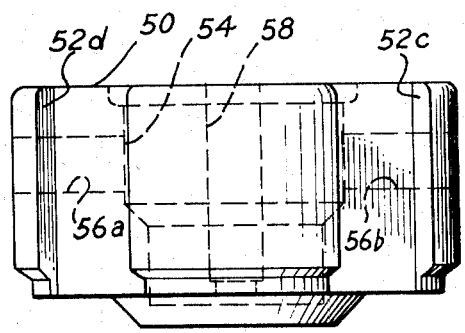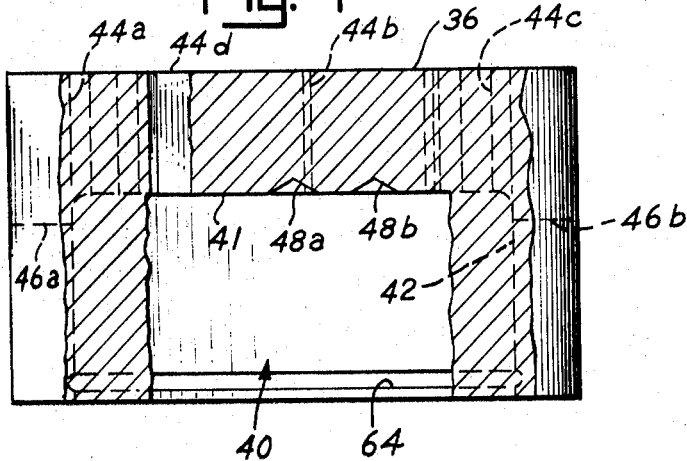

INVENTOR.
RICHARD D. ANDERSON
BY Molinare Allegretti,
Newitt & Witcoff
ATTORNEYS

ADJUSTABLE SHOCK ABSORBER

BACKGROUND AND SUMMARY OF THE INVENTION

This invention relates to a shock absorber and, more particularly, to a shock absorber in which the response in compression and extension may be adjusted.

It is advantageous that the response or "stiffness" of vehicle shock absorbers be adjustably varied to suit various operating conditions. For example, it is frequently desirable that the response or "stiffness" of one or more of the shock absorbers of an automobile be selectively variable so that the shock absorbers will have a given optimum response under normal light load and good road conditions and another given optimum response where the vehicle is to be employed in carrying heavy loads or used on unimproved driving surfaces. Also where a vehicle for example is to be used both on public streets and for drag racing on authorized strips, the shock absorbers of such vehicle should ideally be capable of two completely different given responses each of which is generally unsuitable or undesirable for use under both conditions. In the latter instance where the vehicle is to be operated on a public thoroughfare, the shock absorber response in compression and extension should ideally be approximately 50-50, i.e., the piston of the shock absorber should move at substantially the same rate and with the same degree of "stiffness" in compression as in extension. On the other hand, where the vehicle is to be operated on a drag strip, the ideal response of the piston should be more of the order of 90-10, i.e., where movement of the piston in compression is approximately nine times slower or "stiffer" than in extension. The latter response is preferred at the front axle of the vehicle, since upon rapid acceleration of the vehicle, the front of the vehicle will be maintained elevated so as to keep the center of gravity positioned nearer the rear traction wheels.

The response or "stiffness" of the shock absorber incorporating the principles of the present invention may be readily adjusted in both compression and extension to readily adapt the vehicle for use under widely varying conditions. The shock absorber of the invention obviates the need for maintaining a supply of several differing response shock absorbers and for the physical replacement of the shock absorbers when the vehicle operation is to be changed. The response or "stiffness" of the shock absorber of the invention may be easily and readily accomplished externally of the shock absorber housing, obviating the need for disassembly of the shock absorber. In the shock absorber of the invention, the response or "stiffness" in both compression and extension may be simultaneously varied by a single manual adjustment. Moreover, when adjusting the "stiffness" or response of the shock absorber the nature of adjustment may be readily determined by simple hand "feel" without the use of elaborate devices to insure that the response has been properly adjusted. In a preferred embodiment of the shock absorber of the invention, the shock absorber may actually be adjusted four ways. In this preferred embodiment, a second adjustment means may be provided to vary the response of the shock absorber depending upon the speed of movement of the shock absorber.

In a principal aspect, a shock absorber having a closed fluid filled cylinder, a piston member separating the cylinder into a pair of spaces and a piston rod extending from one end of the cylinder, includes response varying means in the cylinder which selectively and simultaneously varies the response of the piston assembly in both the compression and extension strokes.

In another principal aspect of the invention, a shock absorber in which the response of the piston assembly is adjustable in at least one of the compression and extension strokes also includes response varying means communicating between a reservoir and the cylinder of the shock absorber in bypassing relationship to reservoir check means, and valve means is selectively operable to vary the communication of the response varying means to vary the response of the piston assembly at different speeds.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 3 is a plan view of a preferred embodiment of the piston of the invention taken substantially along line 3 — 3 of FIG. 2;

FIG. 4 is a cross sectional elevation view of the piston taken substantially along line 4 — 4 of FIG. 3;

FIG. 5 is a plan view of a preferred embodiment of valve body of the invention taken substantially along line 5 — 5 of FIG. 2;

FIG. 6 is an elevation view of the valve body of FIG. 5;

DESCRIPTION OF THE PREFERRED EMBODIMENTS

Figure 1:
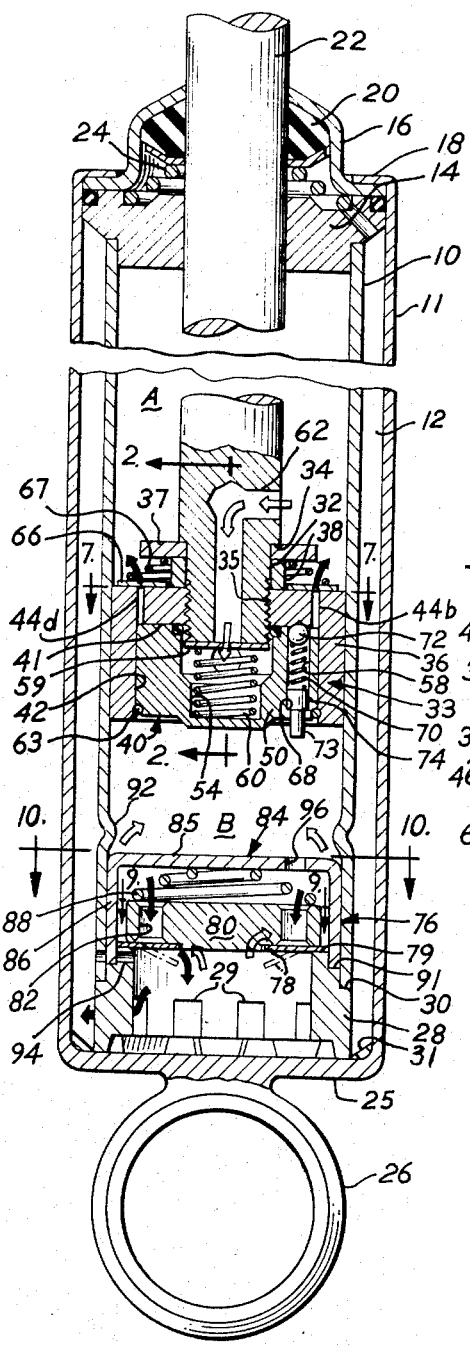
FIG. 1 is a cross sectioned elevation view of a shock absorber including a preferred embodiment of the invention.

Referring to FIG. 1, a shock absorber is shown which includes an inner cylinder 10 and an outer cylinder 11 spaced from the inner cylinder so as to define an annular fluid reservoir 12 therebetween. A sealing plug 14 is fitted in the upper end of cylinder 10 closing the cylinder and the outer cylinder 11 is sealed at its upper end by a cap 16, the outer cylinder being crimped over the perimeter of the cap at 18 or welded thereto to form a sealed enclosure. Packing 20 is provided in the cap which fits around the piston rod 22 of the shock absorber, piston rod 22 extending through the sealing plug 14, the packing 20 and the cap 16. A spring 24 may be provided which acts between the plug 14 and the underside of the packing to insure a tight seal about the piston rod to prevent any leakage from the cylinders.

The bottom of cylinder 11 is also sealed by a closed end 25 which carries an attaching mounting 26 for attaching the shock absorber to the axle of the vehicle. A suitable attachment (not shown) is also carried on the upper distal end of the piston rod 22 to provide for its attachment to the frame of the vehicle. An annular support member 28, having slots 29 therein which communicate the inner cylinder 10 with the reservoir 12, is positioned on the sealed end 25 and the lower end of the inner cylinder rests upon a step 30 on the upper edge thereof. The support member 28 may be centered by way of a bead 31 or the like.

Figure 2:
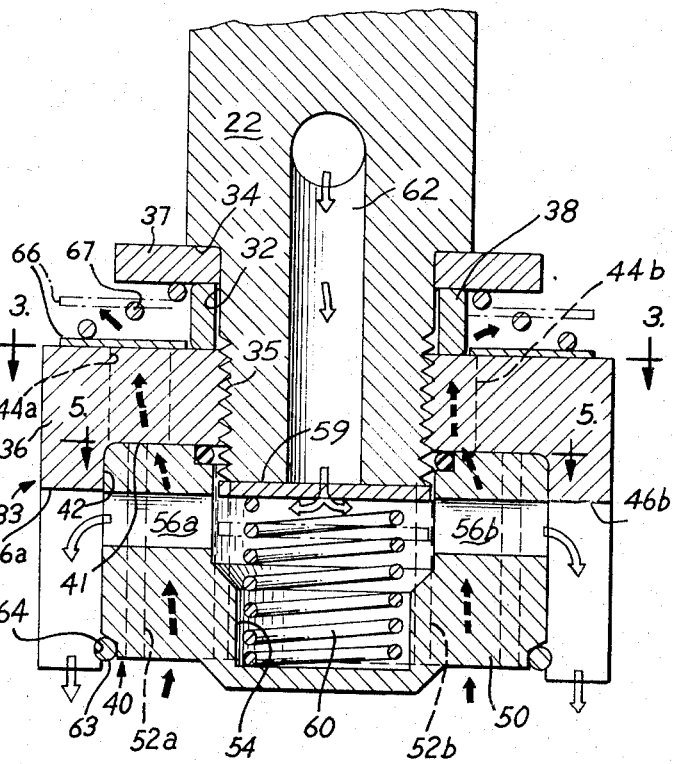
FIG. 2 is an enlarged cross sectioned elevation view of the piston assembly of the shock absorber taken substantially along line 2 — 2 of FIG. 1.

The lower distal end of the piston rod 22, as shown in FIGS. 1 and 2, is somewhat reduced in diameter at 32 to form a shoulder 34. The end of the reduced diameter portion 32 is threaded at 35 so as to threadably receive a cupped shaped piston 36 which forms a part of the piston assembly, generally 33. The piston 36 is spaced from shoulder 34 by a radially extending washer 37 which abuts the shoulder and which is of a diameter slightly larger than that of the piston rod 22, and a smaller diameter spacing washer 38 which extends between washer 37 and the upper surface of the piston 36 spacing these elements from each other.

As shown in FIGS. 1 - 4, the piston 36 preferably comprises a short cylindrical cup shaped member having a recess 40 therein which includes a substantially flat planar wall 41 and a cylindrical downward extending side wall 42. A plurality of slotted passages 44a, 44b, 44c and 44d, which are preferably arcuate in cross section, extend between the wall 41 of the recess and the top face of the piston and communicate with the recess 40 adjacent its cylindrical wall 42. In addition to these slotted passages, a pair of laterally extending slotted passages 46a and 46b are positioned in the sides of the piston 36 and open to the bottom edge thereof. Also several indexing depressions 48a and 48b are preferably formed in the planar wall 41 for response adjustment indexing purposes as will later be described.

Now referring particularly to FIGS. 1, 2, 5 and 6, the piston assembly 33 also includes a cylindrical plug-like valve body 50 which comprises a cylindrical member having a maximum diameter substantially equal to the diameter of the cylinder wall 42 of the piston 36. A plurality of elongated slots 52a, 52b, 52c and 52d, preferably the same in number as the slotted passages 44, are formed in the side wall of the valve body and extend over its height. When the valve body 50 is positioned in recess 40, the slots 52 will be closed over their length by the cylindrical side wall 42 of the piston so as to form fluid flow passages which are arcuate in cross section and which are alignable to a greater or lesser extent with the slotted passages 44 in the piston as will later be described in detail.

A cylindrical chamber 54 is also formed in the center of the valve body 50 and extends to just short of the lower edge of the valve body and in open relationship to the upper face of the valve body. A pair of laterally extending passages 56a and 56b communicate the chamber 54 with the cylindrical surface of the valve body midway between adjacent slots 52a and 52d and 52b and 52c, respectively. A passage 58 is also bored through the height of the valve body which acts as a housing for both the adjustment stop and detent mechanism as will be described in more detail later.

Referring again to FIGS. 1 and 2, a disc 59 and spring 60 are positioned in the chamber 54 of the valve body and the valve body is inserted into the recess 40 of the piston 36. In such position, the spring 60 urges the disc 59 into flow checking relationship with a passage 62 bored in the piston rod 22. When the valve body has been positioned in the recess, a resilient ring 63 is expanded into a groove 64 in the cylindrical wall 42 of the piston, so as to maintain the valve body in the recess. It will be seen that the valve body 50 and piston 36 are rotatable relative to each other such that the slotted passages 52 of the valve body and the slotted passages 44 of the piston, as well as the passages 56 of the valve body and passages 46 of the piston will communicate respectively with each other in greater or lesser degree to transfer fluid between spaces A and B shown in FIG. 1, during the extension and compression strokes of the shock absorber. To complete the piston assembly 33, an annular disc 66 is also positioned between washer 37 and the upper face of the piston 36 in overlying relationship to passages 44. This disc is urged into flow checking relationship with passages 44 by a spring 67 which acts between the disc 66 and washer 37.

As best seen in FIG. 1, the passage 58 in the valve body 50 includes a shoulder 68 at the bottom of the passage and a spring 70 is positioned in the passage. The spring urges a ball detent 72 upward so as to cooperate with one or the other of the indexing depressions 48a or 48b in the piston and also urges an adjusting stop pin 73 downward. Downward movement of the adjusting stop pin is limited by engagement of its enlarged head 74 with shoulder 68, the end of the pin extending below the lowermost surface of the piston and valve body. The pin 73 acts as a rotation stop during adjustment which will be described in more detail later.

During the compression stroke of the piston assembly, a major part of the fluid in space B will be displaced from that space to space A through slotted passages 44 and 52. However, all the fluid in space B which is displaced by the piston assembly cannot be accommodated in space A since the progressively entering piston rod 22 will also increasingly displace a certain volume. Therefore, provision must be made to remove some of the fluid from space B to the reservoir 12 during compression. A check valve assembly 76 is provided for this purpose and is positioned in the bottom of the cylinder 10 to communicate space B with the reservoir 12.

Figure 10:
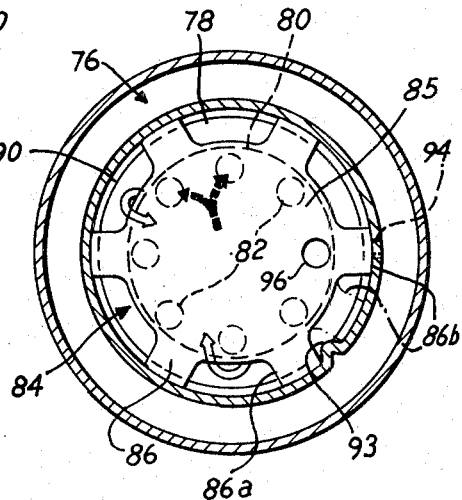
FIG. 10 is a cross sectional plan view of the reservoir check valve assembly taken substantially along line 10 — 10 of FIG. 1.
Figure 9:
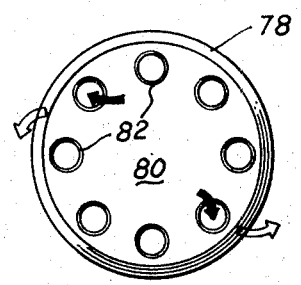
FIG. 9 is a plan view of a portion of the preferred embodiment of reservoir check valve taken substantially along line 9 — 9 of FIG. 1.

Referring to FIGS. 1, 9 and 10, the check valve assembly 76 includes one or more annular resilient valve washers 78 which rest upon the top step edge 79 of the annular support member 28 and a valve plate 80 which rests upon the valve 78. Referring particularly to FIGS. 9 and 10, the valve plate 80 comprises a disc having a plurality of apertures 82 extending through its thickness on a diameter so as to overlie the resilient valve washer. A valve cage 84, having a disc portion 85 and a plurality of downward projecting fingers 86, is positioned with its disc portion 85 over the valve plate 80 and a spring 88 acts between the disc portion and the valve plate in a direction to seat the valve plate 80 and valve 78 on the upper step 79 of the annular support member. The overall diameter of the valve plate 80 and resilient valve 78 is somewhat less than the diameter of the lower end of the inner cylinder 10 so as to form an annular space 90 therebetween. The fingers 86 extend downward through the annular space and rest against a stop 91 intermediate the lower and upper steps 30 and 79 of the annular support member. The entire check valve assembly 76 is maintained in position by an inwardly crimped radial bead 92 about the inner cylinder 10 to prevent upward movement of the valve cage and valve assembly.

In addition, a short vertical stop crimp 93, as shown in FIG. 10, is provided between at least a pair of adjacent ones of the fingers 86a and 86b to limit rotation of the valve cage 84 by a specified amount no greater than the distance between the last mentioned fingers. A relatively small diameter bleed orifice 94 is drilled through the annular support member slightly above the lower tips of the valve cage fingers 86. This orifice affectively provides a bypass around the check valve assembly 76 between the lower space B and the reservoir 12 when the valve cage is rotated to the dot and dash position as shown in FIG. 10 so as to uncover the bleed orifice, communication being by way of the annular space 90. It wil be seen that the bleed orifice bypass is effectively blocked, if the valve cage 84 is rotated to the solid line position shown in FIG. 10, such that one of the fingers 86b of the valve cage covers the orifice.

Also provided in the disc portion 85 of the valve cage is a stop hole 96 which is adapted to receive the downward extending portion of pin 73 during adjustment, as will be described in detail hereafter.

In operation, let it first be assumed that a 50-50 response or "stiffness" of the shock absorber is desired. To arrive at such response, the various passages in the piston 36 and valve body 50 of the piston assembly will be aligned similar to that shown by way of example in FIG. 7. In a 50-50 response adjustment position, the passages 52a, 52b, 52c and 52d in the valve body 50 will be arranged in substantial fully overlapping aligned relationship with the slotted passages 44a, 44b, 44c and 44d respectively in the piston 36 and the lateral passages 56a and 56b in the valve body will be partially aligned with the passages 46a and 46b, respectively of the piston. Thus, the resistance to the transfer of fluid on the compression stroke from space B to space A through passages 44 and 52 is at a minimum and the resistance to the transfer of fluid from space A to space B on the extension stroke is at a maximum, in the 50-50 response position both magnitudes of resistance being approximately equal.

When the piston body 50 is in the 50-50 response position, the detent 72 will be urged upward, as viewed in FIG. 1, to engage one of the index depressions 48b lightly locking the valve body in position relative to the piston 36 and providing a manual hand "feel" sense indication of the proper position.

In operational use in the 50-50 position, when the shock absorber is subjected to a compression stroke, a substantial portion of the fluid which is displaced from space B will flow through the slotted passages 44 and 52 and lift valve 66 to flow into space A. The direction of fluid flow on compression is shown by the solid arrows. Any flow during the compression stroke through passages 46, 57 and 62 is prevented by way of check valve 59 which seats against the bottom of the piston rod 22.

Since more fluid will be displaced from space B than can be accommodated in the upper space A due to the progressive displacement of the entering piston rod, the remaining portion of fluid which cannot be accommodated in the upper space will pass downward between fingers 86 of the valve cage 84, through the apertures 82 in the valve plate 80 and will bias downward the resilient valve 78 as shown in the dot and dash lines in FIG. 1. This fluid will then enter the interior of the annular support member 28 and flow through the slots 29 to the reservoir 12. It will be appreciated that the resistance to flow through the check valve assembly may be varied by employing varying numbers of the resilient valves 78 in stacked relationship.

On the extension stroke, as the piston assembly moves upward, valve 66 will seat to close the slotted passages 44 and 52. However, fluid in the upper space A will pass through bore 62 in the piston rod, and open valve 59 against the force of its spring 60. This fluid will then flow through chamber 54, through the lateral passages 56 in the valve body, through the passages 46 in the piston and into the lower space B. The direction of fluid flow on extension is shown by the light arrows. Since the piston rod is progressively displacing less fluid during the extension stroke, makeup fluid will flow from the reservoir 12 through the slots 29, into the annular support member 28, and lift the valve plate 80 against the force exerted by its spring 88, allowing the fluid to flow upward between the lower face of the valve plate and upper face of resilient valve 78 through the apertures 82 and about the edge of the valve plate through the annular space 90 into the lower space B.

Figure 8:
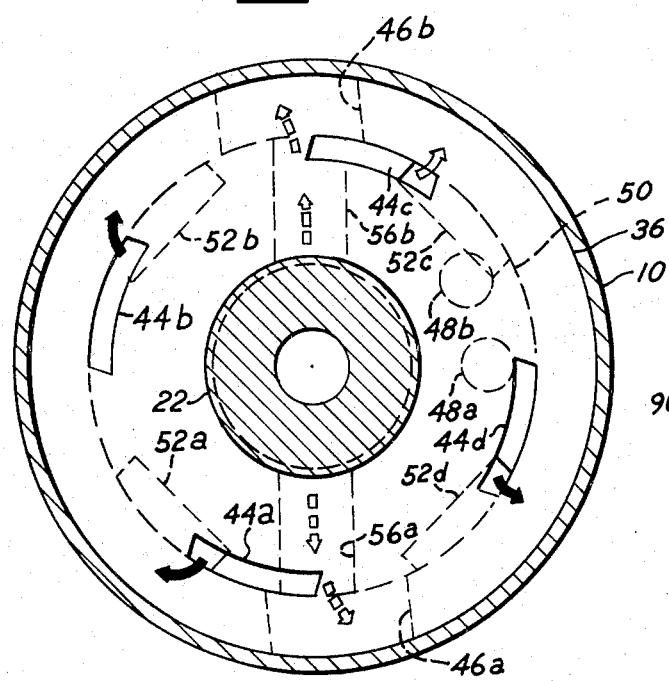
FIG. 8 is a cross sectioned plan view similar to FIG. 7 but showing another response adjustment position of the shock absorber.

Let it now be assumed that it is desired to adjust the response of the shock absorber to say 90-10, i.e. where the resistance or "stiffness" of the shock absorber in compression is about nine times that in extension. To commence adjustment, a compression force is first exerted by hand on the piston rod so as to move the piston assembly 33 downward as viewed in FIG. 1. Once the piston assembly is in its lowermost position, the piston rod 22 is rotated until the pin 73 enters the aperture 96 in the valve cage 84. Since the finger 86a was already positioned in the solid line position as shown in FIG. 10, against the stop crimp 93, the pin will now lock the valve body 50 against further rotation in the counterclockwise direction. Continued rotation of the piston rod 22 in the counterclockwise direction will now cause the piston 36 to continue to rotate relative to the valve body 50, realigning the various passages from the alignment shown in FIG. 7 to that shown substantially in FIG. 8. Thus, in the 90-10 position as shown in FIG. 8, the slotted passages 56 in the valve body will become more fully aligned with the slotted passages 46 in the piston to decrease the resistance to fluid transfer from space A to space B on extension, and, conversely, the passages 44 in the piston will be rotated out of substantially full alignment and into partial alignment only with the slotted passages 52 in the valve body to increase the resistance to fluid transfer from the space B to space A on compression. Thus, resistance to fluid transfer in the compression stroke is substantially increased through the now only partially aligned slotted passages 44 and 52 and resistance to piston movement and fluid transfer in the extension stroke is substantially decreased by the now substantially fully aligned passages 46 and 56.

It will thus be seen that rotation of the piston and its passages relative to the valve body and its passages provides a first response varying means by which the response of the piston member may be simulatenously varied in both compression and extension. It will be appreciated that although this response varying means has been described in terms of the adjustment to increase and decrease the response simultaneously, if desired, the response in compression and extension may both be increased or both be decreased at the same time or by varying amounts, simply by changing the positions of passages 44 and 52 relative to each other.

Once the passages have been readjusted to their new alignment, hand sensing indication will be felt by the person making the adjustment since the detect 72 will snap into the new index depression 48a. In addition to the index sensing indication, the construction of the check valve assembly 76 of the invention may both provide additional response varying means as well as a ready hand "feel" determination of shock absorber response when the piston assembly is moved in compression and extension by hand by way of the bypass provided by the bleed orifice 94.

In the absence of the bypass provided by the bleed orifice, if the person adjusting the shock absorber moves the piston assembly back and forth in the cylinder 10 by hand for the purpose of "feeling" the status of adjustment, a true indication of the adjustment would not be felt, since the spring force of the check valve assembly would determine the "feel" sensed. The effect of springs 60 and 67 on hand "feel" is generally negligible, these springs being light and sufficient only to bias their valves in the proper direction. The principal reason that the spring force of the resilient valve 78 and spring 88 of the check valve assembly becomes a substantial factor effecting hand "feel" is that the piston assembly is only slowly moved bacn and forth by hand. The effect in actual operation of this spring force itself is substantially reduced, since its effect decreases as speed of the piston and the rate of transfer of the fluid increase.

Thus, the bleed orifice 94 may be employed to overcome this lack of hand "feel" by bypassing the check valve assembly 76 and communicating the lower space B directly with the reservoir 12 by way of the annular space 90. Although the diameter of the bleed orifice is small it is sufficient to pass enough of the fluid during the slow hand maniupulation that would otherwise have to pass through the check valve assembly, and thereby obviates the undesirable effect of the check valve assembly spring force on hand "feel." In addition, the bleed orifice may be employed to provide additional response variation in addition to that achieved by the piston and valve previously described. It will be seen that at slow speeds, the resistance to flow of the fluid between the reservoir 12 and chamber B may be decreased or increased depending upon whether the orifice 94 is left open or is closed, respectively. The response effect may be appreciable where low speed shock absorber motion is anticipated during operation, but will be negligible during high speed operation.

In order to open the bleed orifice 94, once the passages in the piston and valve body have been aligned to the position thought to be proper for the response desired, the piston rod 22 is rotated slightly in the clockwise direction as viewed in FIG. 10 while the pin 73 is still engaged in hole 96. As the piston rod is so rotated both the piston 36 and valve body 50 will rotate together due to the action of detent 72, and the pin 73 will rotatably drive the valve cage 84 from the solid line position shown in FIG. 10 to the dot and dash line position, so as to uncover the bleed orifice 94. The valve cage 84 will rotate only until the finger 86b uncovers the bleed orifice 94 and contacts the stop 93. The adjustment position may now be confirmed by hand "feel," by hand manipulating the piston rod 22 in its extension and compression strokes and an arcuate indication of response will be sensed by hand, since flow between the space B and reservoir 12 will be bypassed about the resistance that would otherwise result from the check valve assembly 76.

Once the adjustment is confirmed, the bleed orifice 94 may either be left open or closed depending upon the low speed response desired. If the orifice is to be closed, the piston assembly 33 is again hand lowered until the pin 73 engages the hole 96 in the valve cage. The piston rod is then rotated slightly in the counterclockwise direction causing the valve cage 84 to rotate from the dot and dash line position shown in FIG. 10 back to the solid line position. Rotation of the valve cage at this position will cease when the other adjacent finger 86a of the valve cage contacts the stop 93 and finger 86b will again block the bleed orifice 94 during normal operation of the shock absorber.

Figure 7:
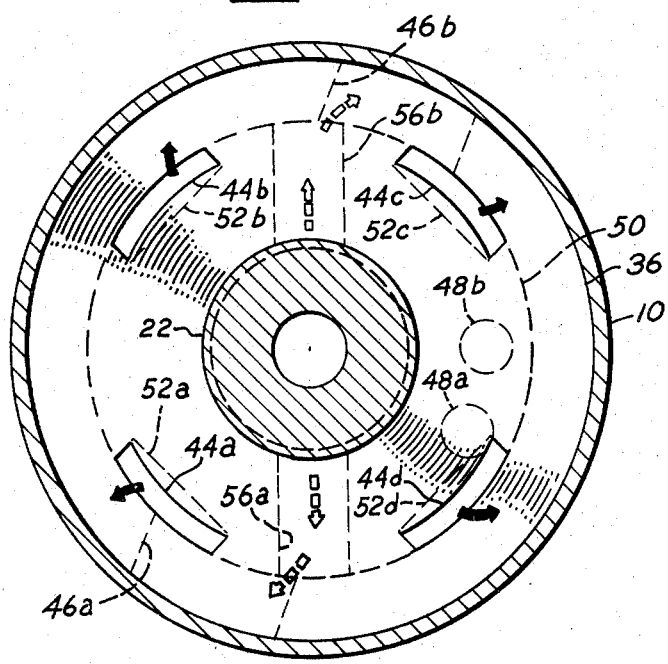
FIG. 7 is a cross sectioned plan view of the piston assembly taken substantially along line 7 — 7 of FIG. 1 and showing one response adjustment position of the shock absorber.

It will be understood that neither of the arrangements shown in FIGS. 7 and 8 are necessarily drawn to scale, the degree of overlap as well as the cross sectional area of the various passages so as to achieve desired fluid transfer resistance being well within the design of one of ordinary skill in the art after he has considered the principles of the invention. It will also be appreciated that although the invention has been described in terms of 50–50 and 90–10 piston response or "stiffness," a wide variety of combinations of desired responses may be attained by practicing the principles of the invention.

It should also be understood that the embodiment of the invention which has been described is merely illustrative of a few of the applications of the principles of the invention. Numerous modifications may be made by those skilled in the art without departing from the true spirit and scope of the invention.

What is claimed is:

1. In a shock absorber including a piston assembly reciprocal in compression and extension strokes, a sealed working cylinder in which the piston assembly is positioned for reciprocation, and a fluid reservoir communicating with said cylinder, wherein the improvement in combination therewith includes response varying means for selectively varying the response of said shock absorber comprising:

resilient check means between said cylinder and said reservoir, said resilient check means controlling the flow of fluid between said reservoir and said cylinder as said piston is reciprocated in at least one of said strokes, bleed means communicating said cylinder and reservoir with each other in bypassing relationship to said check means, and adjustable valve means for selectively controlling the flow of fluid through said bleed means in bypassing relationship to and independently of said check means when said piston is moved in said at least one of said strokes, whereby the response of said shock absorber may be selectively varied in response to the adjustment of said valve means.

2. In the shock absorber of claim 1 including engaging means on said piston assembly for engaging said valve means to selectively open and close said bleed means.

3. In the shock absorber of claim 1 wherein said valve means comprises means rotatable in said cylinder to selectively open and close said valve means.

4. In the shock absorber of claim 1 wherein said valve means is movable between a first position in which said bleed means is fully open and a second position in which said bleed means is fully shut.

5. In the shock absorber of claim 1 wherein said piston assembly separates said cylinder into a pair of spaces,
 a piston rod attached to the piston assembly and extending from one end of the cylinder,
 said piston assembly comprising a piston member attached to said piston rod and a valve member reciprocal with said piston member, said piston assembly being reciprocal in said cylinder during operation and into an adjustment position,
 stop means associated with said piston assembly for locking said valve member against rotation when said piston assembly is moved to said adjustment position, but unlocking said valve member when said piston assembly is not in said adjustment position, said piston member being rotatable relative to said valve member when said piston assembly is in said adjustment position and said valve member is locked, and
 passage means in said piston member and said valve member, the passage means in said piston member being selectively alignable relative to the passage means in said valve member to selectively restrict the flow therethrough between said spaces, such that the response of said piston assembly is selectively varied in said compression and extension strokes by a variation in the alignment of said passage means in response to rotation of said piston member relative to said valve member when said valve member is locked in said adjustment position.

6. In the shock absorber of claim 5 including detent means on said piston assembly for locking said piston member and valve member together in one of several selected response positions.

7. In the shock absorber of claim 5 wherein said bleed means which is selectively operable to vary the response of said piston assembly independently of said piston and valve members such that the response of said piston assembly differs at different speeds of said piston assembly.

8. In the shock absorber of claim 5 including check means asociated with said passage means to selectively permit flow through said passage means when said piston assembly is moved in said extension and compression strokes.

9. In the shock absorber of claim 5 wherein when the response of said piston assembly is increased in said compression stroke the response is simultaneously decreased in said extension stroke and vice versa in response to rotation of said piston member relative to said locked valve member.

10. In the shock absorber of claim 5 wherein said passage means of said piston member includes first and second passages extending therethrough between one of said spaces and the other of said spaces, and said passage means of said valve means includes third and fourth passages, said first and third passages and said second and fourth passages being alignable with each other respectively, the alignment of said first and third passages and said second and fourth passages being selectively variable so as to vary the resistance to the transfer of the fluid between said spaces in response to rotation of said piston member relative to said valve member when said valve member is locked against rotation when said piston assembly is in said adjustment position.

11. In the shock absorber of claim 10 wherein said piston member is fixed to and rotatable with said piston rod in said cylinder, and said stop means engages said valve means to lock said valve means against rotation when said piston rod is rotated, whereby the alignment of the first and second passages in said piston member with the third and fourth passages in said valve means varies upon rotation of said piston member.

12. In the shock absorber of claim 5 wherein said piston assembly comprises,
 a cup shaped piston member defining a cylindrical recess therein, the open face of said piston member facing one of said spaces,
 a first slotted passage in said piston member extending from said recess to the side of the piston member adjacent the other of said spaces,
 a second passage in said piston member communicating the sides of the piston member adjacent said spaces with said recess,
 said valve member including a cylindrical valve body in said recess,
 a third slotted passage in said valve body aligned with said first slotted passage for communicating said spaces with each other, and
 a fourth passage in said valve body aligned with said second passage for communicating said spaces with each other.

13. In the shock absorber of claim 12 including detent means for locking said valve body and said piston member to each other in one of several positions in which their respective passages are aligned.

14. In the shock absorber of claim 12 including check means for preventing transfer of fluid between said spaces through said first and third passages when said piston assembly is on said extension stroke and through said second and fourth passages when said piston assembly is on said compression stroke.

* * * * *